United States Patent [19]

Moan

[11] 4,346,694
[45] Aug. 31, 1982

[54] SOLAR COLLECTOR MODULE

[75] Inventor: Kenneth L. Moan, Toledo, Ohio

[73] Assignee: Owens-Illinois, Inc., Toledo, Ohio

[21] Appl. No.: 235,076

[22] Filed: Feb. 17, 1981

[51] Int. Cl.³ ............................ F24J 3/02; F28D 7/12
[52] U.S. Cl. .................................. 126/443; 126/448; 126/450; 165/142; 165/174
[58] Field of Search ...................... 126/443, 450, 448; 165/135, 136, 172, 173, 174, 175, 177, 155, 142, 143

[56] References Cited

U.S. PATENT DOCUMENTS

| | | | |
|---|---|---|---|
| 3,952,724 | 4/1976 | Pei | 165/142 |
| 3,960,136 | 6/1976 | Moan | 126/443 |
| 4,016,860 | 4/1977 | Moan | 126/443 |
| 4,018,215 | 4/1977 | Pei | 165/142 |
| 4,043,318 | 8/1977 | Pei | 165/166 |
| 4,120,285 | 10/1978 | Nugent | 126/443 |
| 4,126,121 | 11/1978 | Fairbanks | 126/443 |
| 4,262,658 | 4/1981 | Frissora | 126/443 |
| 4,282,857 | 8/1981 | Pei | 126/450 |
| 4,303,059 | 12/1981 | Ford | 126/443 |
| 4,304,222 | 12/1981 | Novinger | 165/176 |

*Primary Examiner*—Daniel J. O'Connor
*Attorney, Agent, or Firm*—John R. Nelson; David H. Wilson; Myron E. Click

[57] ABSTRACT

A solar collector of modular configuration includes a plurality of evacuated collector elements disposed on opposite faces of a manifold in a staggered array. The manifold includes a central baffle which divides it into two parallel passageways through which the heat transfer medium, typically art, may be supplied to and removed from the collector elements. Each of the collector elements comprises an elongate double wall glass tube with one open end, the annulus between the walls being evacuated to a high vacuum. A thin wall metal distributor tube having a diameter marginally smaller than the inside diameter of the collector element and a length marginally longer seats within the collector element. The annulus defined by the distributor tube and inner collector element wall communicates with the proximate passageway and the distributor tube communicates with the distant passageway.

7 Claims, 7 Drawing Figures

SOLAR COLLECTOR MODULE

BACKGROUND OF THE INVENTION

The invention relates generally to solar collectors and, more specifically, to an evacuated tube collector having a plurality of collectors disposed in a staggered array on a dual passageway manifold.

The sophistication of solar collectors has increased dramatically during the last decade. Nonetheless, every configuration including air or water media and flat plate or tube collector designs exhibits performance anomalies that encourage further inventive efforts. In evacuated tube collectors, which utilize air as a heat recovery medium, one area of difficulty has been uniform distribution of the air to the collector elements. Aside from problems of service life associated with operation of the collector elements at elevated temperatures, non-uniform air distribution may seriously degrade the operating efficiency of the collector.

A common answer to non-uniform fluid distribution is to increase the operating pressure and, thus, pressure drop across elements of the system. In solar energy equipment which utilizes air as a heat recovery medium, an increase in system pressure can only be achieved with a concomitant increase in the consumption of energy by the air moving components. Viewed as a thermodynamic system, such an increased energy input into the solar collector may and typically will result in decreased overall thermal efficiency. Thus, this approach may be fraught with difficulties and must be analyzed carefully from a thermodynamic standpoint to determine its overall effect on the efficiency of the system.

This situation suggests that low system pressures and minimal pressure drops may have merit. One such system is disclosed in my previous issued, co-owned U.S. Pat. No. 4,016,860.

Another area of difficulty in solar collector design may be characterized as load matching. The size and cost of solar collectors militates against the purchase and installation of devices capable of supplying energy in excess of demand. Thus, from an installation and purchase standpoint, it is desirable to closely match the output of a solar collector to a load. Due to their novelty and the contemporary market, however, from a manufacturing standpoint, it is not feasible to provide a broad range of solar energy recovery equipment having small incremental differences in energy output. A modular approach is therefore suggested, but the prior art is limited to modular equipment in which flow distribution, flow rates and pressure drops, particularly in air medium equipment, are problematical.

SUMMARY OF THE INVENTION

The instant invention relates to a solar collector of modular configuration having a centrally disposed dual passageway manifold and support frame within which are disposed a plurality of evacuated collector elements in a staggered array. Each of the collector elements comprises an elongate double wall glass tube having one open end and defining an evacuated surrounding volume between the glass walls. A thin wall metal distributor tube having a diameter somewhat smaller than the inside diameter of the inner glass wall is disposed therewithin, and extends somewhat beyond the open end of the glass tube. The plurality of collector elements are mounted in the side walls of the manifold which are parallel to the baffle. The annulus defined by the distributor tube and inner wall of the glass tube communicates with the proximate passageway, and the distributor tube communicates with the distant passageway. Air at low pressure is supplied to one end of one of the passageways and flows into all of the annuli and distributor tubes communicating therewith. Air then travels away from the manifold in either the annuli or distributor tubes, reaches the end of the collector elements and travels inwardly toward the other passageway; the air previously in the annuli now traveling within the distributor tubes and vice-versa. The air flows then combine within the other manifold passageway and exit the solar collector. The balanced design encourages even air distribution and, thus, uniform operating temperatures. Furthermore, such even air distribution is accomplished at low system operating pressures and pressure drops, thereby minimizing energy input. Finally, the configuration and size of the manifold is such that the solar collectors may be arranged end-to-end in a modular system to match energy delivery with load.

It is therefore an object of the instant invention to provide an efficient air medium solar collector having a plurality of evacuated tube collectors.

It is a further object of the instant invention to provide a solar collector having a plurality of evacuated tube collectors disposed in communiction with a dual passageway air manifold.

It is a still further object of the instant invention to provide an evacuated tube solar collector exhibiting minimum pressure drop and energy input.

It is a still further object of the instant invention to provide an evacuated tube solar collector module which may be easily ganged together.

DESCRIPTION OF THE PREFERRED EMBODMENT

Figure 1:
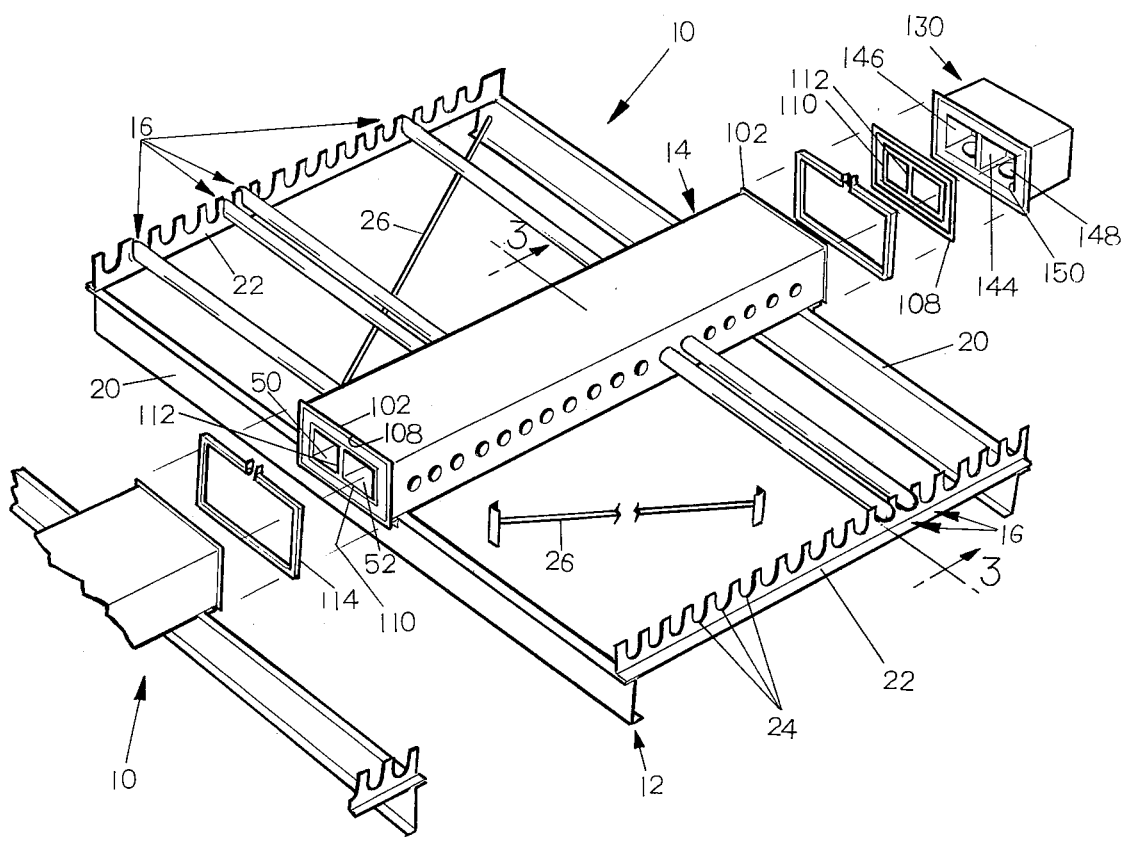
FIG. 1 is a perspective view of a solar collector module according to the instant invention.

Referring now to FIG. 1, a solar collector module according to the instant invention is generally designated by the reference numeral 10. The solar collector module 10 includes a generally rectangular frame assembly 12, a centrally disposed elongate manifold 14 secured to the frame 12, and a plurality of collector elements 16 disposed in two parallel arrays. The preferred embodiment of the module 10 includes thirty-six such collector elements 16 arranged in two arrays of eighteen but it should be apparent that this number may be varied widely. The frame assembly 12 includes a pair of elongate Z-beams 20 which support a pair of perpendicularly disposed, L-shaped collector support beams 22. Each of the collector support beams 22 defines a plurality of U-shaped collector element receiving slots 24. The beams 20 and supports 22 may be fabricated of material such as galvanized sheet metal, aluminum or similar material. The beams 20 and supports 22 may be interconnected by any suitable fastening means such as threaded fasteners, rivets, spot welding or other means. Depending upon the overall size of the module 10 and the strength and rigidity of the beams 20 and supports 22, diagonally or obliquely oriented support struts 26 may be positioned and secured as indicated to strengthen the frame assembly 12.

Figure 2:
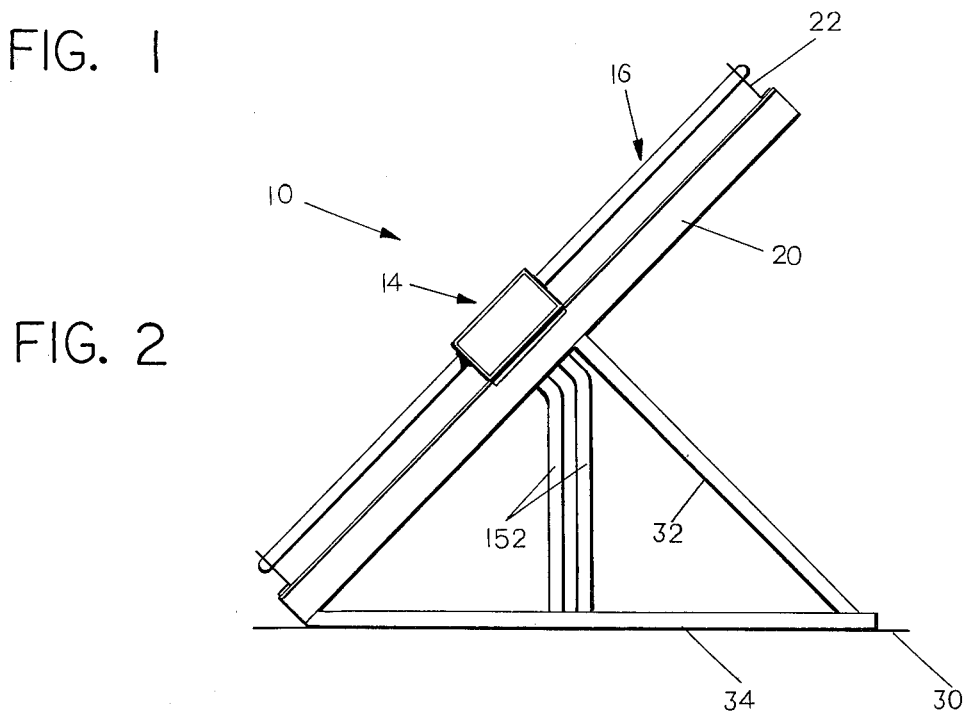
FIG. 2 is an end elevational view of a solar collector module mounted upon a horizontal surface.

Referring now to FIG. 2, the solar collector module 10 is shown installed on, for example, a flat roof 30 or similar horizontal structure. Preferably, the solar collector module 10 is oriented in a southerly direction and at an angle of inclination which optimizes receipt of solar energy at the latitute of its installation. The collector tubes 16 are free standing, that is, the module 10 does not include a mirror, reflector or specular reflection device to concentrate the rays of the sun, but rather relies upon diffuse reflection from the roof 30 or other horizontal or inclined surface on the side of the collector tubes 16 opposite the sun to reflect energy thereinto. Inclined mounting of the solar collector module 10 may be achieved by the utilization of oblique support struts 32 and horizontal beams 34. The triangular support defined by the collector module 10, the struts 32 and beams 34 provide both secure mounting for the module 10 and maintain it at an appropriate inclination. Suitable fasteners such as threaded fasteners or rivets (not illustrated) may be utilized to interconnect the module 10, the struts 32 and the beams 34.

Figure 3:
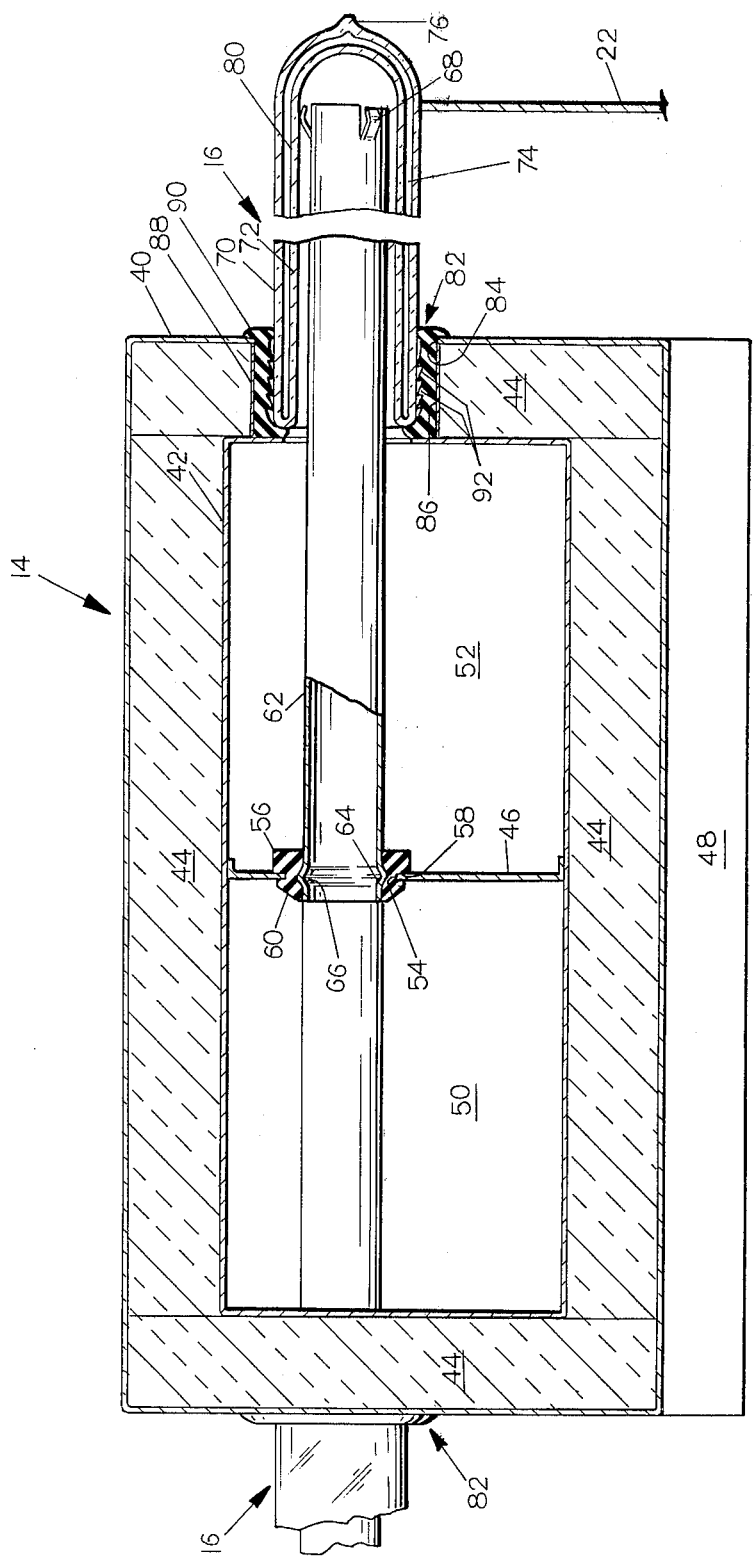
FIG. 3 is a fragmentary, sectional view of a solar collector module manifold taken along 3—3 of FIG. 1.

Referring now to FIG. 3, the elongate manifold 14 is generally rectangular in cross-section and includes an outer sheet metal envelope 40 and a smaller, inner sheet metal envelope 42. Between the outer sheet metal envelope and the inner sheet metal envelope 42 are disposed appropriately sized and oriented preformed slabs of insulation 44. The insulation slabs 44 are preferably fabricated of polyurethane-isocyanate or similar material capable of withstanding maximum temperatures of at least as high as 325° Fahrenheit. The uniform thickness of the preformed slab insulation 44 as well as the accurately formed perpendicular edges ensures that the slabs 44 will fit together tightly and fully fill the rectangular volume between the outer and inner sheet metal envelopes 40 and 42, respectively. The manifold 14 also includes a sheet metal baffle 46 disposed within and secured to the inner sheet metal envelope 42. The baffle 46 includes a bead or narrow flange at each end and divides the region within the inner sheet metal envelope 42 into a first passageway 50 and a second passageway 52.

As subsequent explanation will clarify, one of the passageways 50 or 52 functions as a supply or inlet passageway for a flow of air into the solar collector module 10 whereas the other of the passageways 50 or 52 functions as an outlet or exhaust passageway. As will also become apparent, however, the structure of the solar collector module 10 is such that either of the passageways can function with equal efficiency as either the inlet or outlet passageway. Thus, for purposes of explanation only, it will be assumed that the first passageway 50 is an inlet passageway and that the second passageway 52 is an outlet passageway. An L-shaped bracket 48 is secured to the outer sheet metal envelope 42 at each end of the manifold 14 and facilitates mounting of the manifold 14 to the Z-beams 20 of the frame assembly 12.

The baffle 46 defines a plurality of circular openings 54 each of which receives an annular elastomeric seal member 56. The seal member 56 includes an annular re-entrant groove 58 disposed about its periphery which securely retains the gasket 56 within one of the openings 54 and a frusto-conical surface 60 which facilitates insertion of the seal member 56 into the opening 54. Seated within the seal member 56 is a thin wall metal distributor tube 62. The distributor tube 62 is axially restrained within the seal member 56 by a cooperating outwardly projecting rib 64 formed in the distributor tube 62 adjacent one end which cooperates with a complementarily configured depression 66 on the inner surface of the seal member 56. Each of the distributor tubes 62 also includes a plurality, preferably three, outwardly directed ears or tabs 68 which maintain the distributor tube 62 in coaxial disposition within the collector element 16. The distributor tube 62 illustrated in FIG. 3 provides a flow path in communication with the first passageway 50.

Coaxially disposed about each of the distributor tubes 62 is one of the plurality of evacuated collector elements 16. Each of the collector elements 16 is preferably fabricated of glass and comprises an outer wall 70 and a small diameter, inner wall 72. The walls 70 and 72 define a space 74 therebetween which is evacuated to a deep vacuum of approximately $10^{-4}$ torr. The vacuum is achieved by withdrawing air from within the space 74 at the tip end of the collector element 16 and a tabulation 76 thereat is sealed off according to a process well known in the art. The vacuum within the space 74 substantially eliminates conduction and convection losses from the collector tube 16. The inner wall 72 of the collector element 16 preferably includes a solar energy absorbing surface 80. The energy absorbing surface 80 comprises a wave length selective coating having high absorptivity and low emisivity of 0.1 or lower in the infrared region and can be fabricated by the vacuum deposition of a thin layer (1000 Angstroms) of aluminum on the outer surface of the inner wall 72 of the collector element 16. A layer of chromium is then electrically vaporized and deposited over the aluminum substrate as black chrome to a thickness of approximately 1500 Angstroms. Alternatively, the surface 80 may be blackened with an over-coating of an infrared energy absorbing material such as magnesium oxide, magnesium fluride, etc. The collector elements 16 are seated and secured within the manifold 14 in an annular molded silicon seal 82 which in turn seats within an appropriate opening 84 in the outer sheet metal envelope 40 and circular cavity 86 defined by the insulation slab 44. The molded seal 82 is secured within the cavity 86 by an appropriate adhesive, preferably a silicon base adhesive which is disposed in a layer 88 coincident with the annulus of contact between the molded seal 82 and the insulation slab 44. The molded seal 82 includes an outer lip 90 which functions as a weather seal and further includes a plurality of inwardly directed triangular ribs 92 which function as a chevron seal to tightly grip and seal against the collector element 16 to the manifold 14.

Figure 4:
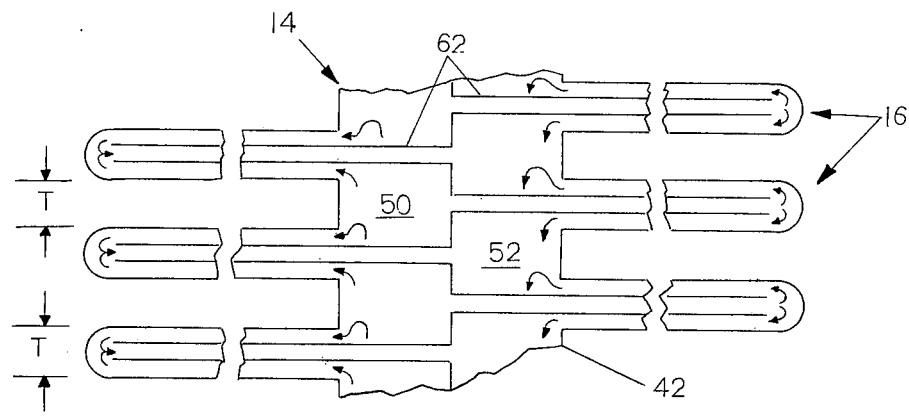
FIG. 4 is a diagrammatic view of air flow through the solar collector module manifold and collector elements.

Referring now to FIG. 4, the flow of the heat recovery medium such as air through the manifold 14, the collector elements 15 and the distributor tubes 62 will be described. As noted previously, the designation of the passageways 50 and 52 as the first passageway 50 and the second passageway 52 highlights the identical configuration of the passageways and associated components. However, for purposes of explanation, it will be assumed that the first passageway 50 is an inlet passageway and as such, is supplied with a heat recovery medium, such as air. Air within the inlet passageway 50 is divided into plural, parallel flow paths and may enter any one of the circular passageways defined by the distributor tubes 62 or the annular passageways defined by the outer surface of the distributor tube 62 and the inner surface of the inner wall 72 of the collector element 16. In either event, air flow is outward, away from the inlet passageway 50. When the flow of air reaches the terminus of the distributor tube 62 or the terminus of the inner wall 72 of the collector element 16, the flow is redirected, in the first instance, into the annulus defined by the distributor tube 62 and the inner surface of the inner wall 72 or, in the second instance, into the circular passageway within the distributor tube 62. The flow of air is now inward, toward the outlet passageway 52. Here the flows through the individual collector elements 15 and the distributor tubes 62 recombine and exit the outlet passageway 52.

It should be noted that while it has generally been found more convenient and practical to provide inlet and outlet connections at the same end of the solar collector module 10 such that the flows within the first passageway 50 and second passageway 52 are in opposite directions, a supply connection at one end of the module 10 may be utilized with an exhaust connection at the opposite end of the module 10 such that flow of the medium within the first passageway 50 and the second passageway 52 is in the same direction.

Figure 5:
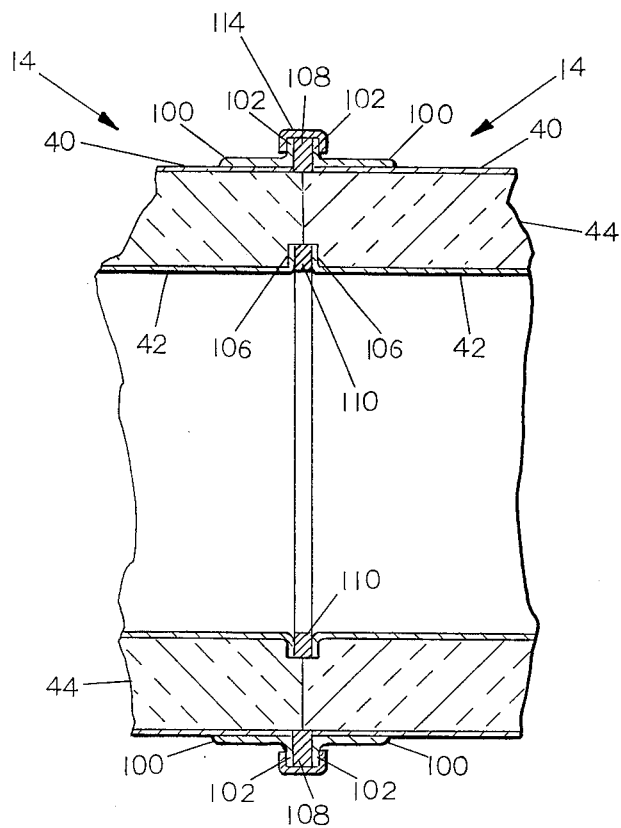
FIG. 5 is an enlarged, fragmentary elevational view of the connection between two adjacent solar collector module manifolds.

Referring now to FIGS. 1 and 5, the manner of interconnecting the solar collector modules 10 will be described. At each end of every elongate manifold 14 is an L-shaped member 100. The L-shaped member 100 is preferably secured to the outer metal envelope 40 adjacent its terminus by rivets or other suitable fastening means and includes an outwardly directed co-terminal outer flange 102. A region adjacent each end of the inner metal envelope 42 is formed into an outwardly directed inner flange 106 which is coplanar with the outer flange 102. The outer flanges 102 and inner flanges 106 are similarly disposed at each end of each of the manifolds 14 such that end-to-end juxtaposition of the manifolds 14 correspondingly juxtaposes and aligns the pair of outer flanges 102 and the pair of inner flanges 106. Disposed between the opposed faces of the flanges 102 and 106 are a pair of rectangular gaskets, an outer gasket 108 and an inner gasket 110, respectively. The inner gasket 110 includes a central web 112 which aligns with and seals adjacent ends of the baffles 46. The gaskets 108 and 110 may be fabricated of any suitable resilient material having a low durometer measurement such that sealing deformation may be readily achieved when pressure is applied thereto. Securement of one manifold 14 to another and maintenance of a suitable seal therebetween is achieved by encircling the outer flanges 102 with a U-shaped strap of the type generally known as a Marmon clamp 114. The Marmon clamp 114 includes a means (not illustrated) such as a threaded fastener disposed between opposed ends to reduce the diameter of the clamp 114 and thereby tighten it about the perimeter of the abutting flanges 102.

Figure 6:
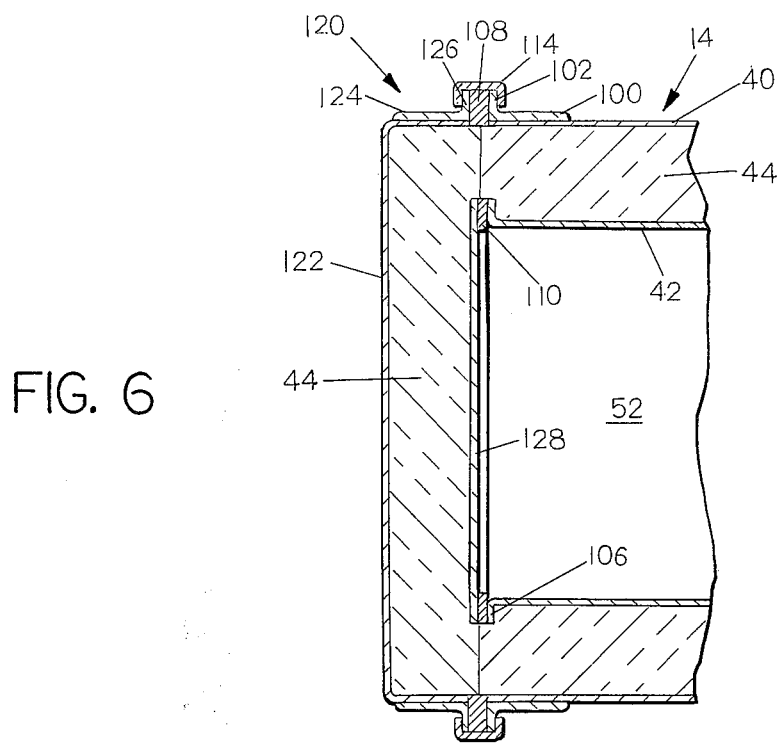
FIG. 6 is an enlarged, fragmentary elevational view of an end closure of a solar collector module manifold.

Referring now to FIGS. 1 and 6, an end closure 120 of similar construction is utilized to close the end of the manifold 14 and specifically the first and second passageways 50 and 52, respectively, at the end of the module 10 or array of modules 10 opposite the heat recovery medium inlets and outlets. The closure 120 includes a generally rectangular sheet metal envelope 122 having an L-shaped member 124 secured about its periphery with rivets or other suitable fastening means. The L-shaped member 124 includes an outwardly directed flange 126 of appropriate size which faces and aligns with the outer flange 102 disposed about the manifold 14. The closure 120 also includes a centrally disposed plate 128 which generally covers the ends of the passageways 50 and 52 and faces and aligns with the inner flange 106 disposed within the manifold 14. The volume between the metal envelope 122 and the plate 128 is occupied by slab insulation 44. A low durometer outer gasket 108 and inner gasket 110, the inner gasket 110 including a central web 112, are similarly disposed between the opposed faces of the flanges 102 and 106, respctively. A Marmon clamp 114 is disposed about the periphery of the outer flange 102 of the manifold 14 and the outer flange 126 of the enclosure 120. These components cooperatively seal the end of the manifold 14.

Figure 7:
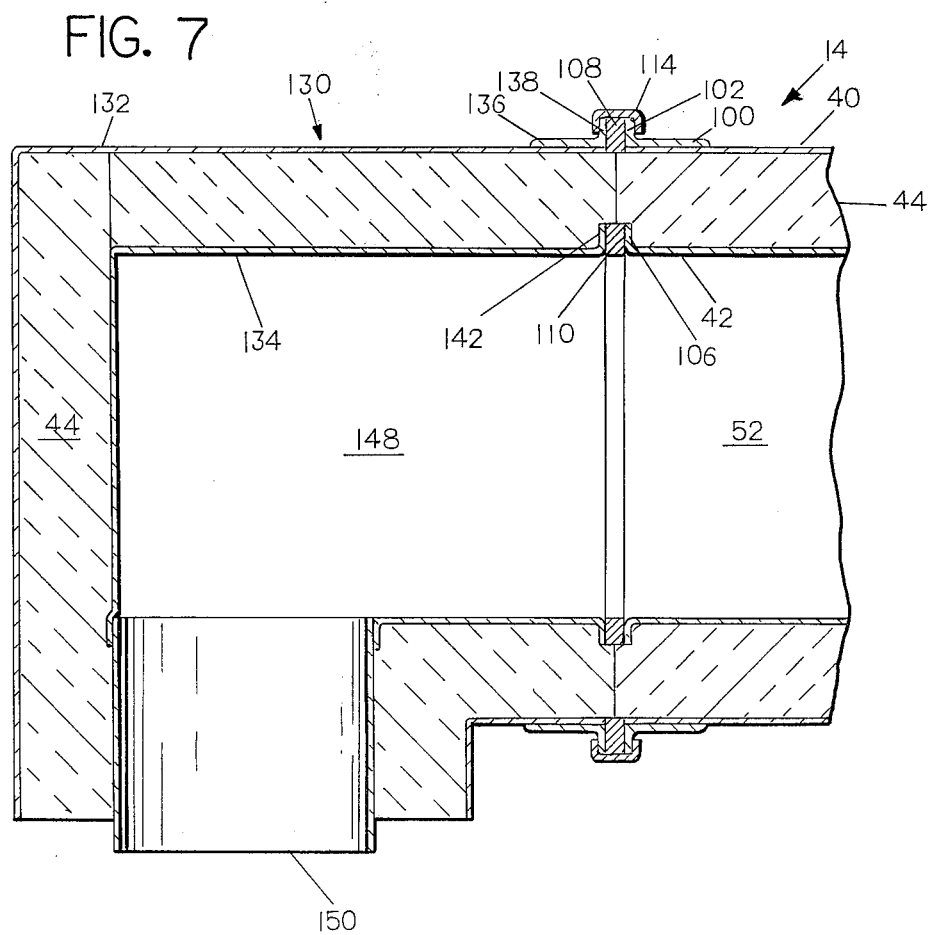
FIG. 7 is an enlarged, fragmentary elevational view of the interconnection between a solar collector module manifold and an air duct.

Referring now to FIGS. 2 and 7, a similar construction is utilized to connect the module or modules 10 to an external heat recovery medium supply and receiving means. An enclosure 130 is fabricated in a manner similar to the manifold 14, having an outer metal envelope 132 and a smaller, inner metal envelope 134 defining a volume therebetween which is occupied by the slab insulation 44. The enclosure 130 is substantially identical to the manifold 14 in height and width and is disposed generally adjacent an end thereof. Connection to the manifold 14 is again achieved by means of an L-shaped member 136 which may be secured to the outer metal envelope 132 by suitable fastener means. The outer L-shaped member 136 includes an outer flange 138 of appropriate size and orientation such that is opposes and aligns with the flange 102 on the manifold 14. The enclosure 130 also includes an outwardly directed inner flange 142 formed from the inner metal envelope 134 which faces and aligns with the inner flange 106 of the manifold 14. Again, an outer gasket 108 and an inner gasket 110 having a central web 112 are positioned between the faces of the outer flanges 102 and 138 and inner flanges 103 and 142, respectively. A Marmon clamp 114 secures the enclosure 130 to the manifold 14. The enclosure 130 also includes a baffle 144 having a flanged edge which seals against the gasket web 112 and generally divides the interior of the enclosure 130 into a first chamber 146 which communicates with a first passageway 50 and a second chamber 148 which communicates with the second passageway 52. The enclosure 130 also includes a pair of independent, circular ducts 150 which communicate with a respective one of the chambers 146 or 148. The ducts 150 provide a convenient circular surface to which conventional ducts 152, illustrated in FIG. 2, may be readily attached.

A solar collector module 10 according to the instant invention enjoys exceptional heat recovery efficiency. Several factors contribute to this efficiency. First of all, the flow path from inlet to outlet includes a minimum number of restrictions and flow reversals. Furthermore, the staggered arrangement of the distributor tubes 52 and the collector elements 16 encourages both a low pressure drop within the collector module 10 and uniform distribution of the heat recovery medium throughout the collector elements 16 and the distributor tubes 62.

FIG. 4 illustrates in schematic form the preferable spacing between adjacent collector elements 16. Where the diameter of a collector element 16 is given as "T" the optimum density of collector tubes and the optimum energy collection efficiency has been found to be achieved when the collector elements 16 are spaced apart a distance "T." Stated differently, the center-to-center spacing between adjacent ones of the collector elements 16. It should be noted, however, that this center-to-center spacing should neither be considered to be limiting of the instant invention nor an absolute which should not be modified.

With regard to the cross-sectional areas of the circular passageway defined by the distributor tube 62 and the annular passageway defined by the outer wall of the distributor tube 62 and the inner surface of the inner wall 72 of the collector element 16, it should be noted that the cross-sectional area of the former is substantially larger. Such a disparity of cross-sectional areas results in increased flow velocity within the annular region and accompanying turbulence which disturbs boundary layers adjacent the inner and outer surfaces of the annulus thereby improving heat transfer to the medium. By way of example, a thin-walled distributor tube 62 having a diameter of approximately 1.25 inches will have an inner cross-sectional area of approximately 1.2 square inches. When positioned within the inner wall 72 of a collector element 16 having an inside diameter of approximately 1.54 inches, the resulting annulus has a cross-sectional area of approximately 0.6 square inches or about one-half the cross-sectional area of the inner passageway of the distributor tube 62. Thus, not only is the air more turbulent within the annulus and thus less likely to form insulating boundary layers but the energy loss and pressure drop associated with the turbulence is incurred to gain significant increases in energy recovery and thus an improvement in overall efficiency.

An evacuated tube solar collector, according to the instant invention which utilizes air as the heat recovery medium, also exhibits structural advantages. The open collector array, i.e., the lack of continuous reflector panels and/or protective transparent covers, as well as the cylindrical outer surfaces of the collector elements 16 result in very low aerodynamic drag, and virtually eliminate considerations of wind loading. Such reduced drag minimizes the necessity of large, heavy and expensive supporting structures which can significantly increase the overall cost of the solar energy collector system. Furthermore, the use of a gas, preferably air, as the heat recovery medium rather than water or other liquids lowers the operating weight of the collector and further reduces the size and expense of associated structural components.

Finally, the staggered, alternating arrangement of distributor tubes 62 and collector elements 16, greatly simplifies the construction of the manifold assembly 14. As is apparent, only two parallel passageways 50 and 52 of simple, rectangular configuration are required to provide supply air to, and receive return air from every element 16 of the module 10. The parallel arrangement of air passgeways as well as the fact previously noted that the passageways may function as either a supply or return passageway greatly simplifies ganging and actual physical interconnection of the modules 10.

The foregoing disclosure is the best mode devised by the inventor for practicing this invention. It is apparent, however, that devices incorporating modifications and variations will be obvious to one skilled in the art of solar energy collection. Inasmuch as the foregoing disclosure is intended to enable one skilled in the pertinent art to practice the instant invention, it should not be construed to be limited thereby, but should be construed to include such aforementioned obvious variations and be limited only by the spirit and scope of the following claims.

What is claimed is:

1. A solar collector module comprising, in combination, a manifold having an outer sheath, an inner sheath, a layer of insulating material disposed between said sheaths, a baffle disposed within said inner sheath and defining two passageways, and flange means for connecting said manifold to associated devices, a plurality of evacuated tube collector assemblies, each assembly comprising an elongate collector element having an inner wall and an outer wall, and an elongate hollow member disposed therein and defining an inner passageway within said member and an outer passageway between said member and said inner wall of said collector element, said inner passageway of each of said assemblies communicating with one of said two manifold passageways and the outer passageway of said each of said assemblies communicating with the other of said two manifold passageways, and a gasket disposed generally between said collector elements and said manifold sheaths and insulating material, said collector elements arranged in a staggered coplanar array on opposed sides of said manifold.

2. The solar collector module of claim 1 further including a frame means for supporting said manifold and said collector assemblies.

3. The solar collector module of claim 1 wherein said elongate hollow members include means for maintaining them centrally within said collector elements.

4. The solar collector module of claim 1 further including gaskets disposed between said baffle and said elongate hollow members.

5. The solar collector module of claim 1 further including means for sealing of one end of said manifold and means for connecting the other end of said manifold to air supply and return ducts.

6. The solar collector of claim 1 further including an adjustable strap means cooperating with said flange means for securing said associated devices to said manifold.

7. The solar collector of claim 1 wherein the cross-sectional area of said inner passageway is approximately twice the cross-sectional area of said outer passageway.

* * * * *